United States Patent
Murui et al.

(10) Patent No.: US 11,632,017 B2
(45) Date of Patent: Apr. 18, 2023

(54) MOTOR FOR ELECTRIC POWER TOOLS AND ELECTRIC POWER TOOL

(71) Applicant: Panasonic Intellectual Property Management Co., Ltd., Osaka (JP)

(72) Inventors: Itaru Murui, Mie (JP); Masari Muramatsu, Aichi (JP); Motoharu Muto, Mie (JP); Kota Kitamura, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 315 days.

(21) Appl. No.: 16/828,690

(22) Filed: Mar. 24, 2020

(65) Prior Publication Data
US 2020/0313511 A1   Oct. 1, 2020

(30) Foreign Application Priority Data
Mar. 29, 2019   (JP) .............................. JP2019-068212

(51) Int. Cl.
| H02K 7/14 | (2006.01) |
| B25B 21/02 | (2006.01) |
| B25F 5/02 | (2006.01) |
| H02K 11/215 | (2016.01) |

(52) U.S. Cl.
CPC ............. *H02K 7/145* (2013.01); *B25B 21/02* (2013.01); *B25F 5/02* (2013.01); *H02K 11/215* (2016.01)

(58) Field of Classification Search
CPC ...... B25B 21/02; H02K 11/33; H02K 11/215; H02K 7/145; B25F 5/02

USPC ........................................................ 310/50
See application file for complete search history.

(56) References Cited

U.S. PATENT DOCUMENTS

| 5,895,994 A * | 4/1999 | Molnar | H02K 1/165 310/410 |
| 6,906,483 B2 * | 6/2005 | Tominaga | B62D 5/0406 361/752 |
| 8,378,540 B2 * | 2/2013 | Furukawa | H02K 29/08 310/90 |

(Continued)

FOREIGN PATENT DOCUMENTS

| CN | 202260946 U | 5/2012 |
| JP | 2010-214518 A | 9/2010 |

(Continued)

OTHER PUBLICATIONS

Extended European Search Report issued in corresponding European Patent Application No. 20164016.6, dated Aug. 13, 2020.

(Continued)

*Primary Examiner* — Alex W Mok
(74) *Attorney, Agent, or Firm* — McDermott Will & Emery LLP

(57) ABSTRACT

A motor for electric power tools according to an embodiment includes: a rotor having a rotational shaft; a stator having a coil to rotate the rotor; a first substrate mounting a sensor element to detect a rotational position of the rotor; and a second substrate mounting a switching element to change, based on a result of detection by the sensor element, a conducting direction in which a current flows with respect to the coil. The first substrate and the second substrate are arranged side by side along, and intersect at right angles with, the rotational shaft.

12 Claims, 5 Drawing Sheets

(56) References Cited

U.S. PATENT DOCUMENTS

| | | | |
|---|---|---|---|
| 9,359,004 B2* | 6/2016 | Kawata | B62D 5/0463 |
| 9,391,491 B2* | 7/2016 | Yoshida | H02K 5/20 |
| 9,882,446 B2* | 1/2018 | Kitaji | H02K 5/1735 |
| 9,893,590 B2* | 2/2018 | Sawada | H02K 29/08 |
| 2006/0053577 A1 | 3/2006 | Moein et al. | |
| 2006/0175913 A1 | 8/2006 | Hempe et al. | |
| 2010/0320880 A1 | 12/2010 | Kamogi | |
| 2012/0319508 A1 | 12/2012 | Oomori | |
| 2014/0028161 A1 | 1/2014 | Kamogi | |
| 2016/0141939 A1 | 5/2016 | Aoyama | |
| 2017/0353085 A1 | 12/2017 | Kitamura et al. | |
| 2018/0127020 A1* | 5/2018 | Asao | H02K 11/33 |
| 2018/0152062 A1 | 5/2018 | Chang et al. | |
| 2018/0262092 A1 | 9/2018 | Beyerl et al. | |

FOREIGN PATENT DOCUMENTS

| | | |
|---|---|---|
| JP | 2013-000831 A | 1/2013 |
| JP | 2014-168361 A | 9/2014 |
| JP | 2016-93133 A | 5/2016 |
| JP | 2016-127654 A | 7/2016 |
| WO | 2013/094086 A | 6/2013 |

OTHER PUBLICATIONS

European Office Action dated Jun. 22, 2022 issued for the corresponding European Patent Application No. 20164016.6.

Japanese Office Action dated Aug. 2, 2022 issued for the corresponding Japanese Patent Application No. 2019-068212, with English translation.

* cited by examiner

MOTOR FOR ELECTRIC POWER TOOLS AND ELECTRIC POWER TOOL

CROSS-REFERENCE TO RELATED APPLICATION

The present application is based upon, and claims the benefit of foreign priority to, Japanese Patent Application No. 2019-068212, filed on Mar. 29, 2019, the entire contents of which are hereby incorporated by reference.

TECHNICAL FIELD

The present disclosure relates to a motor for use in electric power tools and also relates to an electric power tool. More particularly, the present disclosure relates to a motor with a sensor element for use in electric power tools and an electric power tool including such a motor.

BACKGROUND ART

JP 2013-000831 A discloses an electric power tool. The electric power tool includes: a motor with a stator coil; and a circuit board. The stator coil includes: a coil body; and an extended portion extended from the coil body and electrically connected to the circuit board.

According to JP 2013-000831 A, switching elements, position detection elements, and other circuit components are integrated together on an inverter circuit board. It is difficult for a motor with such a configuration to provide even higher torque output and extend its continuous running time.

SUMMARY

The present disclosure provides a motor for electric power tools, having the ability to provide high-torque output and extend its continuous running time, and also provide an electric power tool including such a motor.

A motor for electric power tools according to an aspect of the present disclosure includes: a rotor having a rotational shaft; a stator having a coil configured to rotate the rotor; a first substrate mounting a sensor element thereon, the sensor element being configured to detect a rotational position of the rotor; and a second substrate mounting a switching element thereon, the switching element being configured to change, based on a result of detection by the sensor element, a conducting direction in which a current flows with respect to the coil. The first substrate and the second substrate are arranged side by side along, and intersect at right angles with, the rotational shaft.

An electric power tool according to another aspect of the present disclosure includes: the motor for electric power tools; and an electric power tool body configured to house the motor for electric power tools therein.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

1. Overview

A motor 1 for electric power tools according to an exemplary embodiment of the present disclosure is implemented as a brushless motor. The motor 1 for electric power tools may be used as, for example, a drive source for an electric power tool 10 such as a drill driver or an impact driver.

Figure 1:
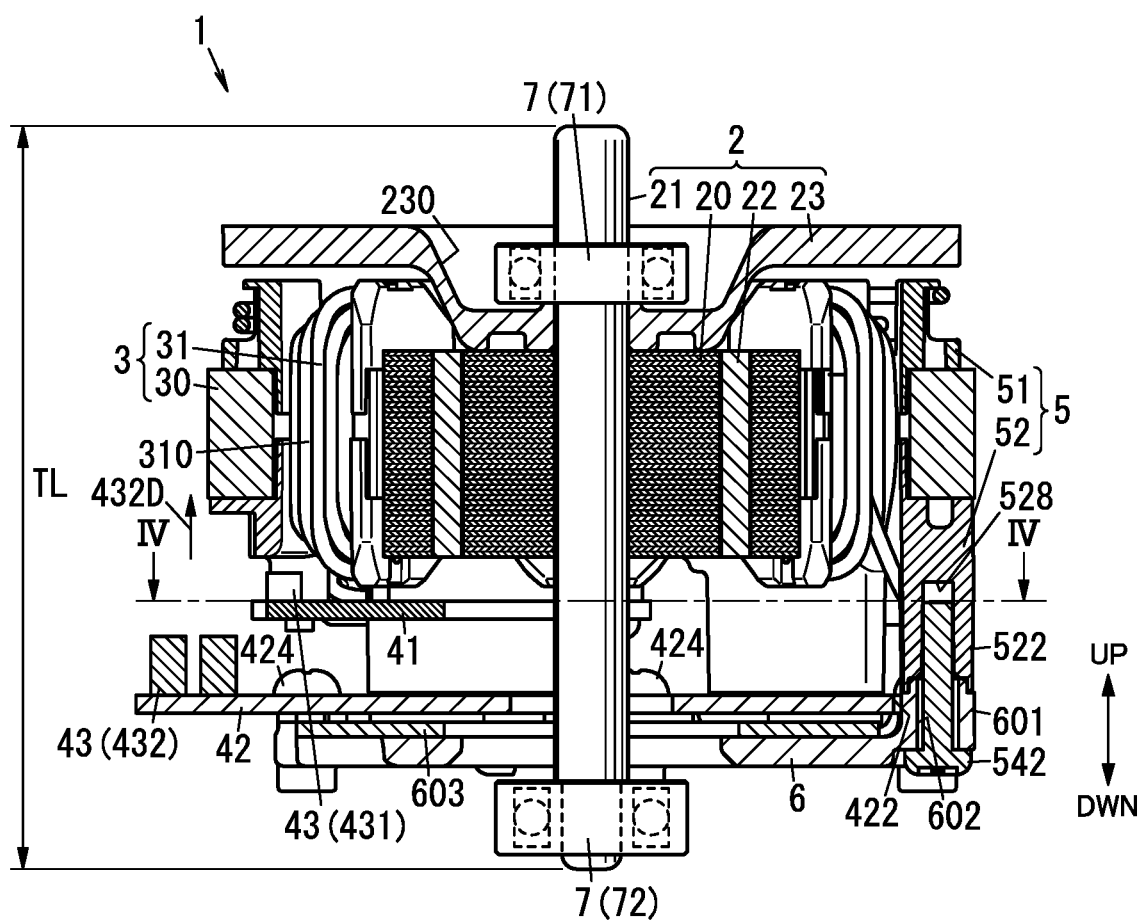
FIG. 1 is a cross-sectional view of a motor for electric power tools according to an exemplary embodiment of the present disclosure.

As shown in FIG. 1, the motor 1 for electric power tools includes; a rotor 2; a stator 3; a first substrate 41; and a second substrate 42. The rotor 2 includes a rotational shaft 21. The stator 3 includes a coil 31. The coil 31 causes the rotor 2 to rotate. Sensor elements 410 are mounted on the first substrate 41 (see FIG. 4). The sensor elements 410 are elements for detecting the rotational position of the rotor 2. Switching elements 425 are mounted on the second substrate 42. The switching elements 425 are elements for changing, based on the result of detection by the sensor elements 410, a conducting direction in which a current flows with respect to the coil 31.

In this embodiment, the first substrate 41 and the second substrate 42 are arranged side by side along, and intersecting at right angles with, the rotational shaft 21 This allows the motor 1 to provide high-torque output and have an extended continuous running time.

2. Details

<Motor for Electric Power Tools>

Figure 2:
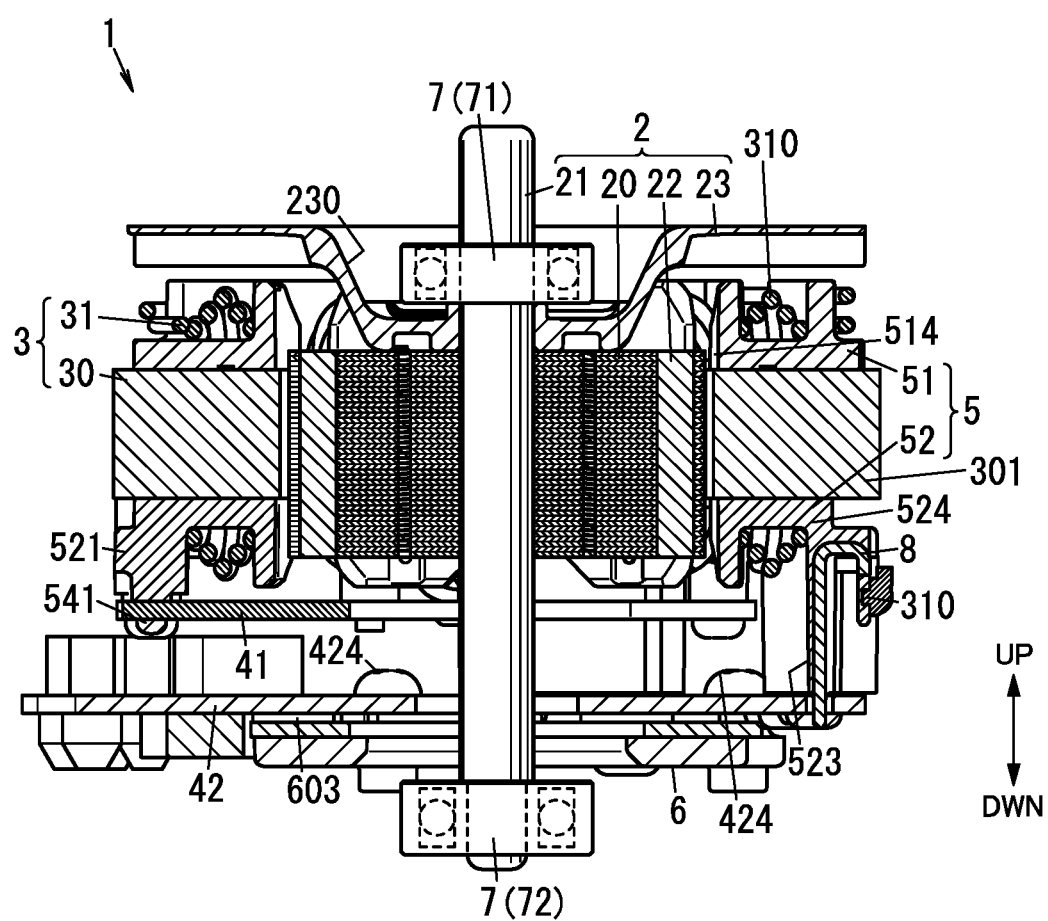
FIG. 2 is a cross-sectional view of the motor for electric power tools as viewed from a different angle.

As shown in FIG. 1, the motor 1 for electric power tools according to this embodiment includes: the rotor 2; the stator 3; the first substrate 41; the second substrate 42; an insulator 5; a heat sink 6; two bearings 7 (hereinafter referred to as a "first bearing 71" and a "second bearing 72," respectively); and a terminal member 8 (see FIG. 2).

In the following description, the direction in which the rotational shaft 21 extends will be hereinafter referred to as an "upward/downward direction," one end of the rotational shaft 21 as an "upper end," and the other end of the rotational shaft 21 as a "lower end." That is to say, the upward/downward direction will be defined just as indicated by the double-headed arrows in FIG. 1. Nevertheless, the arrows should not be construed as defining the direction in which the motor 1 for electric power tools should be used. Rather, the arrows indicating the directions are shown on the respective drawings just for convenience sake and are insubstantial ones.

<<Rotor>>

The rotor 2 is a rotational member. The rotor 2 includes: the rotational shaft 21; a rotor body 20; a plurality of (e.g., four in this embodiment) permanent magnets 22; and a cooling fan 23.

The rotational shaft 21 is secured to the rotor body 20 so as to run through the rotor body 20.

The rotor body 20 has the shape of a cylinder, of which the center axis is defined by the rotational shaft 21 and which extends along the rotational shaft 21. The upper and lower surfaces of the rotor body 20 are perpendicular to the direction in which the rotational shaft 21 extends.

The permanent magnets 22 are embedded in the rotor body 20 and are arranged at regular intervals along the circumference of the rotational shaft 21.

The cooling fan 23 is fixed to the rotor body 20 and the rotational shaft 21 on the upper surface of the rotor body 20. The cooling fan 23 has a circular shape in a top view and has the shape of a hat overall. The cooling fan 23 has a recess 230. The recess 230 is a space to house the first bearing 71. The recess 230 is a space downwardly depressed around the center of the cooling fan 23. The rotor 2 is rotatable along the circumference of the rotational shaft 21.

<<Stator>>

The stator 3 is arranged around the outer periphery of the rotor 2. The stator 3 includes an iron core 30 and a coil 31.

Figure 3:
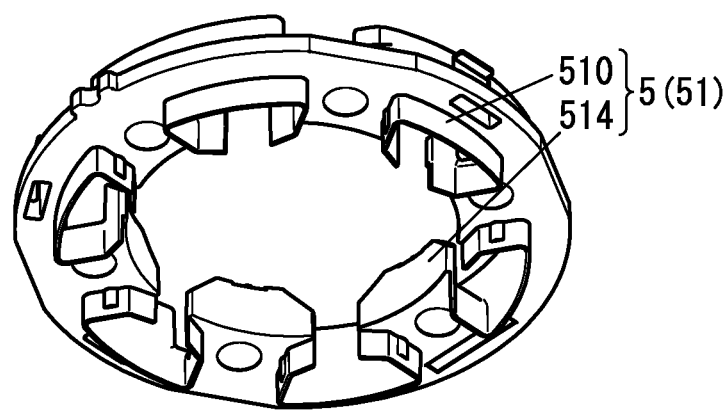
FIG. 3 is a perspective view of the iron core of a stator and an insulator as viewed from below the stator and the insulator.
Figure 3:
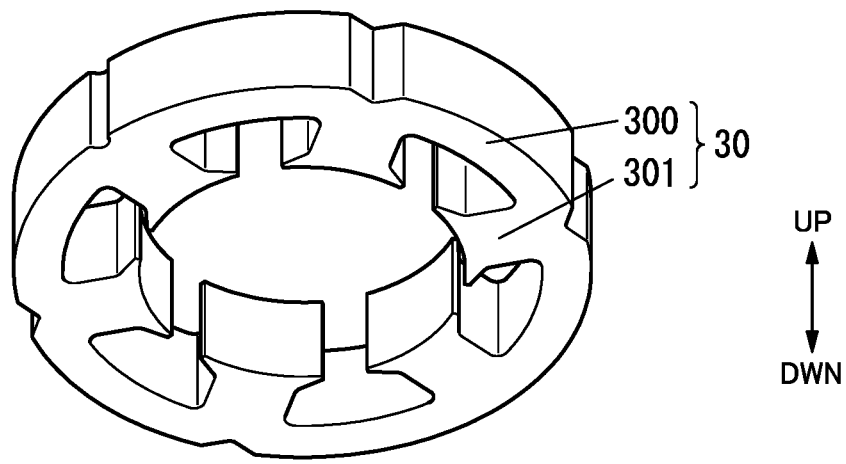
Figure 3:
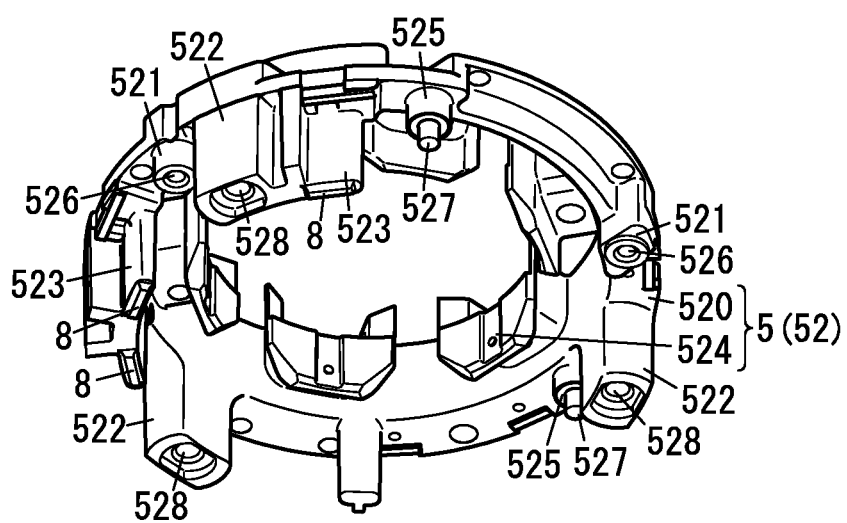

As shown in FIG. 3, the iron core 30 includes a cylindrical portion 300 and a plurality of (e.g., six in this embodiment) teeth 301. The cylindrical portion 300 has the shape of a cylinder extending along the rotational shaft 21. The six teeth 301 are arranged at regular intervals on an inner circumferential surface of the cylindrical portion 300. Each of the six teeth 301 has a generally T-shape in a top view.

The coil 31 is a member that causes the rotor 2 to rotate. The coil 31 is formed by winding a wire 310 around the six teeth 301 (see FIG. 2). When the motor 1 for electric power tools is used, the coil 31 is cooled by the cooling fan 23.

<<First Substrate>>

The first substrate 41 is a so-called "sensor substrate." That is to say, the first substrate 41 is a circuit board for use to detect the rotational position of the rotor 2.

The first substrate 41 is arranged under the rotor body 20 so as to be parallel to the lower surface of the rotor body 20. The sensor elements 410 are mounted on the first substrate 41. The sensor elements 410 may be Hall elements, for example. The sensor elements 410 are elements for detecting the rotational position of the rotor 2.

Figure 4:
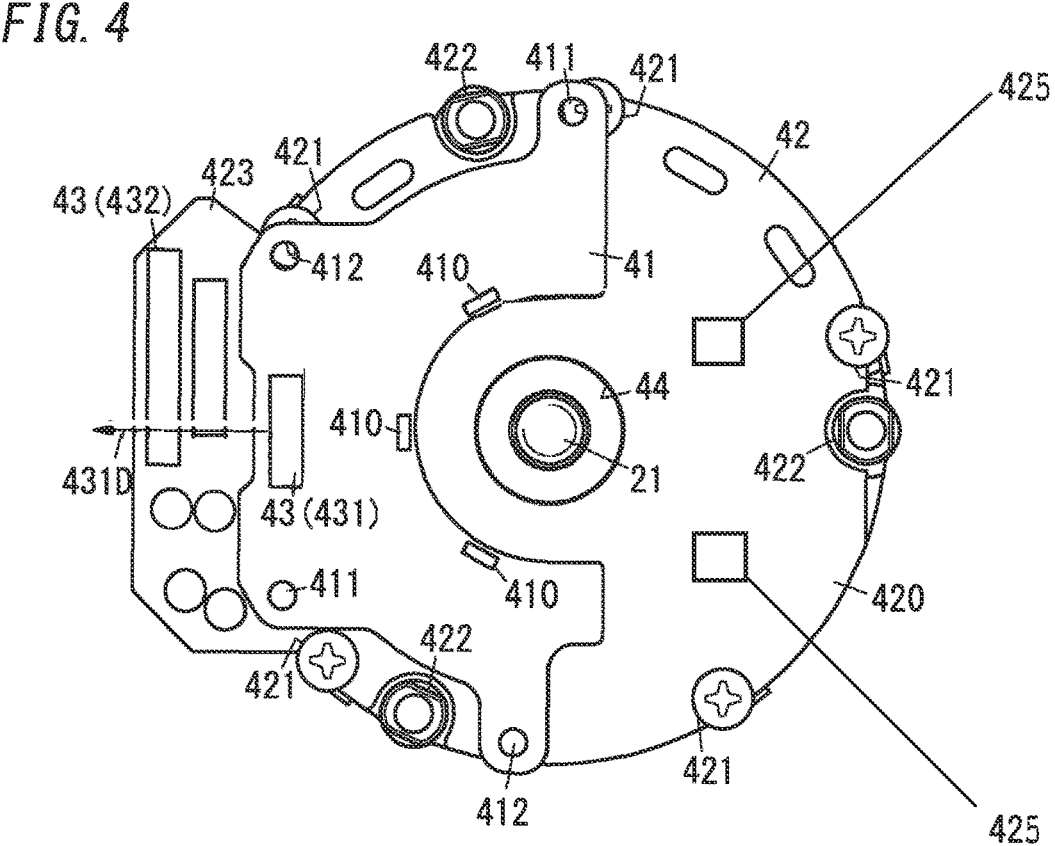
FIG. 4 is a cross-sectional view of the motor taken along the plane IV-IV shown in FIG. 1.
Figure 5:
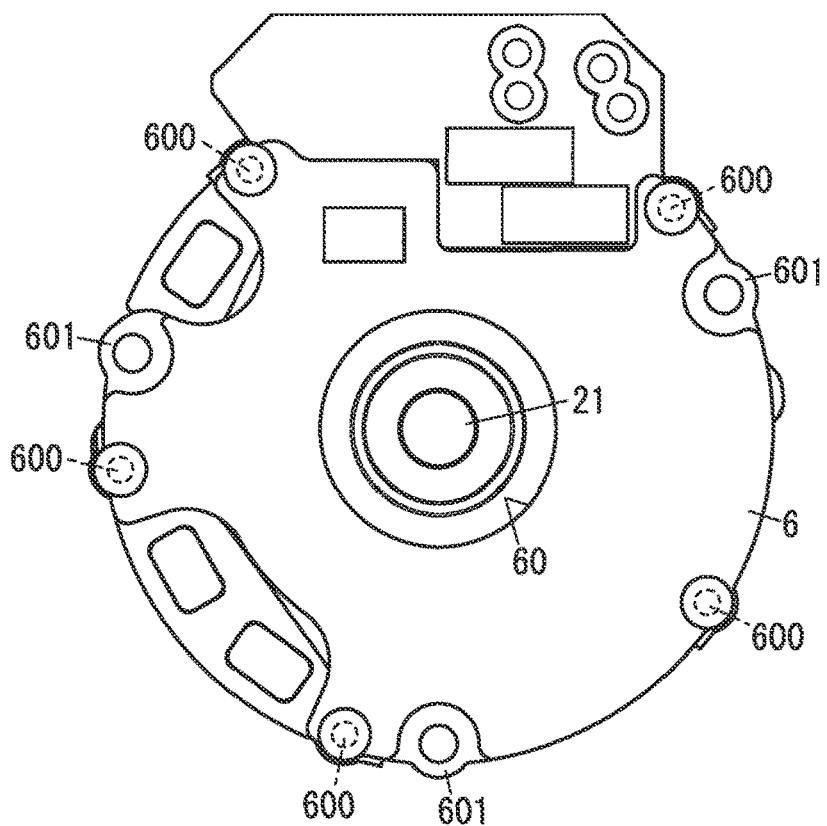
FIG. 5 is a bottom view of the motor for electric power tools.

As shown in FIG. 4, the first substrate 41 has a generally C-shape in a top view. The first substrate 41 surrounds the outer periphery of the rotational shaft 21 generally halfway through. That is to say, the first substrate 41 is arranged in an area forming part of the circumference of the rotational shaft 21. As can be seen, there is no need to arrange the first substrate 41 entirely around the rotational shaft 21, thus reducing the amount of the material for use to make the first substrate 41.

The first substrate 41 includes: a connecting member 43 (a first connecting member 431); a plurality of (e.g., two in this embodiment) mounting holes 411; and a plurality of (e.g., two in this embodiment) positioning holes 412.

The first connecting member 431 is a member to be electrically connected to an external device (not shown). The first connecting member 431 may be implemented as a connector, or a pad, for example. Position detection signals generated by the sensor elements 410 are transmitted through the first connecting member 431 to the external device. The first connecting member 431 is provided along an outer peripheral edge of the first substrate 41. The connecting direction in which the first connecting member 431 is connected to the external device is defined radially outward with respect to the rotational shaft 21 (as indicated by the arrow 431D in FIG. 4). The connecting direction may be the direction in which a lead wire (not shown) is extended, for example. Note that the external device may be a microcomputer including a control circuit, for example.

The mounting holes 411 are holes for use to fix the first substrate 41 onto the insulator 5. The mounting holes 411 are provided along an outer peripheral edge of the first substrate 41. The mounting holes 411 run through the first substrate 41 in the upward/downward direction.

The positioning holes 412 are holes for use to fix the first substrate 41 onto the insulator 5. The positioning holes 412 are provided along an outer peripheral edge of the first substrate 41. The positioning holes 412 run through the first substrate 41 in the upward/downward direction.

<<Second Substrate>>

The second substrate 42 is a so-called "switching substrate." That is to say, the second substrate 42 is a circuit board for use to change the conducting direction in which a current flows with respect to the coil 31 of the stator 3. The second substrate 42 includes an inverter circuit.

The second substrate 42 is arranged under, and parallel to, the first substrate 41. Switching elements 425 are mounted on the second substrate 42. The switching elements 425 may be field-effect transistors (FETs), for example. The switching elements 425 are elements for changing, based on the result of detection by the sensor elements 410, the conducting direction in which a current flows with respect to the coil 31.

As shown in FIG. 4, the second substrate 42 includes a circular portion 420 and an expanded portion 423.

The circular portion 420 has a generally circular shape in a top view. The outer diameter of the circular portion 420 is substantially equal to the outer diameter of the stator 3. The circular portion 420 has a through hole 44, a plurality of (e.g., five in this embodiment) first cutouts 421, and a plurality of (e.g., three in this embodiment) second cutouts 422.

The through hole 44 is a hole into which the rotational shaft 21 is inserted. The through hole 44 runs through a generally central region of the circular portion 420 in the upward/downward direction.

The first cutouts 421 are cutouts for use to fix the second substrate 42 to the heat sink 6. The first cutouts 421 are provided along an outer peripheral edge of the circular portion 420. Each of the first cutouts 421 has a generally semi-circular shape in a top view. The first cutouts 421 are open radially outward with respect to the rotational shaft 21.

The second cutouts 422 are cutouts for use to fix the heat sink 6 to the insulator 5. The second cutouts 422 are provided along an outer peripheral edge of the circular portion 420. Each of the second cutouts 422 has a generally semi-circular shape in a top view. The second cutouts 422 are open radially outward with respect to the rotational shaft 21.

The expanded portion 423 has a generally rectangular shape in a top view. The expanded portion 423 is a portion expanded radially outward with respect to the rotational shaft 21 from a part of an outer periphery of the circular portion 420. When viewed from over the first substrate 41 and second substrate 42 that overlap with each other in a top view, the expanded portion 423 of the second substrate 42 sticks out of the outer peripheral edge of the first substrate 41. As can be seen, when measured along the radius of the rotational shaft 21, the first substrate 41 and the second substrate 42 have mutually different dimensions. In other words, the expanded portion 423 is a portion representing the difference in dimension between the first substrate 41 and the second substrate 42. Various types of parts may be mounted on the expanded portion 423. Among other things, a part, of which a dimension is greater than the gap between the first substrate 41 and the second substrate 42, may be mounted on the expanded portion 423 particularly effectively. That is to say, the first substrate 41 does not interfere with mounting a bulky part on the upper surface of the expanded portion 423 of the second substrate 42. The expanded portion 423 rather allows the gap between the first substrate 41 and the second substrate 42 to be narrowed. As can be seen, using the first substrate 41 and second substrate 42 with mutually different dimensions allows an installation space to be secured for various types of parts.

The expanded portion 423 includes a connecting member 43 (hereinafter referred to as a "second connecting member 432"). The second connecting member 432 is a member for electrically connecting the second substrate 42 to an external device (not shown). The second connecting member 432 may be implemented as a connector or a pad, for example. A drive signal supplied from the external device is transmitted to the second substrate 42 via the second connecting member 432. In accordance with the drive signal received, the conducting direction in which a current flows with respect to the coil 31 is changed to rotate the rotor 2. The second connecting member 432 is arranged on the upper surface of the expanded portion 423.

The second connecting member 432, as well as the first connecting member 431, is arranged on one side of the rotational shaft 21 in the direction perpendicular to the rotational shaft 21. That is to say, the first connecting member 431 and the second connecting member 432 are arranged on the same side of the rotational shaft 21 with respect to the rotational shaft 21. In other words, the first connecting member 431 and the second connecting member 432 are not arranged separately on one side and the other side of the rotational shaft 21 in the direction perpendicular to the rotational shaft 21. Arranging the first connecting member 431 and the second connecting member 432 on two different sides with respect to the rotational shaft 21 would require a space for connecting a lead wire (not shown) to the first connecting member 431 or the second connecting member 432 on each side of the rotational shaft 21. In contrast, arranging the first connecting member 431 and the second connecting member 432 on the same side of the rotational shaft 21 allows the respective spaces for connecting the lead wires to the first connecting member 431 and the second connecting member 432 to be combined together into a single space. This reduces the overall size of the motor 1 for electric power tools.

The connecting direction in which the second connecting member 432 is connected to the external device is upward along the rotational shaft 21 (as indicated by the arrow 432D in FIG. 1). As can be seen, the first connecting member 431 and the second connecting member 432 are connected to the external device in mutually different directions. Connecting the first connecting member 431 and the second connecting member 432 in the same direction could leave a dead space in a direction different from the connecting direction. In contrast, connecting the first connecting member 431 and the second connecting member 432 in two different directions allows the dead space to be reduced.

<<Positional Relation Between First Substrate and Second Substrate>>

As shown in FIG. 1, the first substrate 41 and the second substrate 42 are arranged side by side in the direction in which the rotational shaft 21 extends. That is to say, the first substrate 41 and the second substrate 42 are arranged one on top of the other in the upward/downward direction. In addition, the first substrate 41 and the second substrate 42 intersect the rotational shaft 21 at right angles. Specifically, the surface, on which the sensor elements 410 are mounted, of the first substrate 41 and the surface, on which the switching elements 425 are arranged, of the second substrate 42 are perpendicular to the rotational shaft 21.

Furthermore, the first substrate 41 and the second substrate 42 face each other in the direction in which the rotational shaft 21 extends. Specifically, the lower surface of the first substrate 41 (i.e., the surface facing away from the rotor body 20) and the upper surface of the second substrate 42 (i.e., the surface facing toward the rotor body 20) face each other. The larger the area where the first substrate 41 and the second substrate 42 face each other (i.e., the larger the area of overlap when viewed along the rotational shaft 21) is, the shorter the radial dimension of the motor 1 for electric power tools becomes, thus enabling the overall size of the motor 1 for electric power tools to be reduced.

The first substrate 41 is arranged between the stator 3 and the second substrate 42 in the direction in which the rotational shaft 21 extends. That is to say, the stator 3, the first substrate 41, and the second substrate 42 are located at the upper, middle, and lower levels, respectively.

The first substrate 41 and the second substrate 42 are located within a range defined by the total length of the rotational shaft 21. In FIG. 1, the total length of the rotational shaft 21 is designated by TL. Specifically, the upper end of the rotational shaft 21 is located over the first substrate 41, and the lower end of the rotational shaft 21 is located under the second substrate 42. This reduces the overall size of the motor 1 for electric power tools.

In this embodiment, the sensor elements 410 and the switching elements 425 are not mounted on the same substrate but are mounted separately on the first substrate 41 and the second substrate 42, respectively. This allows the distance from the rotor 2 to the first substrate 41 and the distance from the stator 3 to the second substrate 42 to be adjusted independently of each other. That is to say, the closer to the rotor 2 the sensor elements 410 are, the more accurately the sensor elements 410 are able to detect the rotational position of the rotor 2. This allows the motor 1 for electric power tools to provide high-torque output. On the other hand, the more distant from the coil 31 of the stator 3 the switching elements 425 are, the less significantly the switching elements 425 are affected by the heat generated by the coil 31. This allows the motor 1 for electric power tools to have an extended continuous running time.

<<Insulator>>

The insulator 5 is a member with electrical insulation properties. The insulator 5 may be made of a resin such as nylon, for example.

The insulator 5 fixes the stator 3, the first substrate 41, and the second substrate 42 thereon, thereby electrically insulating the stator 3, the first substrate 41, and the second substrate 42 from each other. As shown in FIG. 3, the insulator 5 includes a first insulator 51 and a second insulator 52. The first insulator 51 and the second insulator 52 are integrated with the iron core 30 of the stator 3 by insert molding.

The first insulator 51 covers an upper part of the iron core 30. Specifically, the first insulator 51 includes an annular portion 510 and a plurality of (e.g., six, which is the number of the teeth 301, in this embodiment) tooth covering portions 514.

The outer diameter of the annular portion 510 is substantially equal to the outer diameter of the cylindrical portion 300 of the iron core 30. The annular portion 510 covers the upper surface of the cylindrical portion 300.

The six tooth covering portions 514 are arranged at regular intervals on the inner circumferential surface of the annular portion 510. Each of the six tooth covering portions 51 covers the upper surface of an associated one of the six teeth 301.

The second insulator 52 covers the lower part of the iron core 30. Specifically, the second insulator 52 includes an annular portion 520, a plurality of (e.g., six, which is the number of the teeth 301, in this embodiment) tooth covering portions 524, a plurality of (e.g., two in this embodiment) first mounting portions 521, a plurality of (e.g., two in this embodiment) positioning portions 525, a plurality of (e.g., three in this embodiment) second mounting portions 522, and a terminal protecting portion 523.

The outer diameter of the annular portion 520 is substantially equal to the outer diameter of the cylindrical portion 300 of the iron core 30. The annular portion 520 covers the lower surface of the cylindrical portion 300.

The six tooth covering portions 524 are arranged at regular intervals on the inner circumferential surface of the annular portion 520. Each of the six tooth covering portions 524 covers the lower surface of an associated one of the six teeth 301. Specifically, the coil 31 is formed by winding a wire 310 around the teeth 301, of which the upper and lower surfaces are respectively covered with the upper and lower tooth covering portions 514, 524 as shown in FIG. 2.

The first mounting portions 521 are provided to mount the first substrate 41 thereon. The first mounting portions 521 protrude downward from the lower surface of the annular portion 520. The two first mounting portions 521 have the same protrusion length. Each of the first mounting portions 521 has a screw hole 526. The screw hole 526 is cut through the tip surface (bottom surface) of the first mounting portion 521. Passing a screw 54 through each of the mounting holes 411 from under the first substrate 41 and fastening the screw 54 into the screw hole 526 of its associated first mounting portion 521 as shown in FIG. 2 allows the first substrate 41 to be fixed onto the second insulator 52.

The positioning portions 525 are used for positioning when the first substrate 41 is fixed onto the second insulator 52. The positioning portions 525 protrude downward from the lower surface of the annular portion 520. The protrusion length of the two positioning portions 525 is equal to that of the first mounting portions 521. Each of the positioning portions 525 has a projection 527. The projection 527 protrudes from the tip surface (bottom surface) of the positioning portion 525. Passing each projection 527 through an associated one of the positioning holes 412 from over the first substrate 41 allows the first substrate 41 to be positioned.

The second mounting portions 522 are provided to mount the second substrate 42 thereon. The second mounting portions 522 protrude downward from the lower surface of the annular portion 520. The three second mounting portions 522 have the same protrusion length. Each of the second mounting portions 522 has a screw hole 528. The screw hole 528 is cut through the tip surface (bottom surface) of the second mounting portion 522.

The protrusion length of the second mounting portions 522 is greater than the protrusion length of the first mounting portions 521. As can be seen, the first mounting portions 521 and the second mounting portions 522 are arranged at mutually different levels in the direction in which the rotational shaft 21 extends. This allows the first substrate 41 and the second substrate 42 to be arranged at two different levels in the direction in which the rotational shaft 21 extends.

The terminal protecting portion 523 protrudes downward from the lower surface of the annular portion 520. The protrusion length of the terminal protecting portion 523 is substantially equal to the protrusion length of the second mounting portions 522. As shown in FIG. 2, the terminal protecting portion 523 is in contact with the second substrate 42.

<<Heat Sink>>

The heat sink 6 is a member with heat dissipation properties. The heat sink 6 may be made of a metal such as aluminum.

The heat sink 6 has the shape of an incomplete circle having generally the same outer diameter as the stator 3 in a top view. The heat sink 6 is arranged under the second substrate 42. The heat sink 6 has a through hole 60, a plurality of (e.g., five in this embodiment) screw holes 600, and a plurality of (e.g., three in this embodiment) mounting portions 601.

The through hole 60 is a hole through which the rotational shaft 21 is passed. The through hole 60 runs through a generally central region of the heat sink 6 in the upward/downward direction.

The screw holes 600 are provided to mount the second substrate 42 onto the heat sink 6. The screw holes 600 are provided along an outer peripheral edge of the heat sink 6. Passing the screws 424 through the first cutouts 421 from over the second substrate 42 and fastening the screws 424 into the screw holes 600 of the heat sink 6 as shown in FIG. 1 allows the second substrate 42 to be fixed onto the heat sink 6.

The mounting portions 601 are provided to mount the heat sink 6 onto the second insulator 52. As shown in FIG. 1, the mounting portions 601 protrude upward from the upper surface of the heat sink 6. The outer diameter of the mounting portions 601 is substantially equal to the inner diameter of the second cutouts 422 of the second substrate 42. Each of the mounting portions 601 has a mounting hole 602. The mounting hole 602 runs through the mounting portion 601 in the upward/downward direction. Passing the mounting portions 601 through the second cutouts 422 from under the second substrate 42, further passing the screws 542 through the mounting holes 602 from under the heat sink 6, and then fastening the screws 542 into the screw holes 528 of the second mounting portions 522 of the second insulator 52 allows the heat sink 6 to be fixed onto the second insulator 52. In this manner, the second substrate 42 is fixed onto the insulator 5 via the heat sink 6. This improves the heat dissipation properties of the motor 1 for electric power tools. Among other things, mounting the second substrate 42 onto the heat sink 6 improves the heat dissipation properties of the second substrate 42. In addition, an insulating sheet 603 is interposed between the second substrate 42 and the heat sink 6 to electrically insulate the second substrate 42 and the heat sink 6 from each other and bring the second substrate 42 and the heat sink 6 into thermal contact with each other.

<<Bearings>>

The two bearings 7 (namely, the first bearing 71 and the second bearing 72) support the rotational shaft 21 rotatably.

The first bearing 71 is located over the cooling fan 23 in the direction in which the rotational shaft 21 extends. The first bearing 71 is housed in the recess 230 of the cooling fan 23. The thickness (i.e., the dimension measured along the rotational shaft 21) of the first bearing 71 is smaller than the depth (i.e., the dimension measured along the rotational shaft 21) of the recess 230.

The second bearing 72 is located under the heat sink 6 in the direction in which the rotational shaft 21 extends. As can be seen, the first substrate 41 and the second substrate 42 are arranged between the two bearings 7 (71, 72). This reduces the overall size of the motor 1 for electric power tools.

<<Terminal Member>>

The terminal member 8 is a member for electrically connecting the coil 31 and the second substrate 42 together. As shown in FIG. 2, the terminal member 8 is fixed onto the insulator 5. Specifically, the terminal member 8 is embedded at least partially in the terminal protecting portion 523 of the second insulator 52 by insert molding. As can be seen, the terminal member 8 is protected by the terminal protecting portion 523. The terminal member 8 has electrical conductivity. The terminal member 8 may be implemented as a metal plate, for example. The cross-sectional area of the terminal member 8 is larger than the cross-sectional area of the wire 310 of the coil 31. The wire 310 of the coil 31 is electrically connected to one end (upper end) of the terminal member 8. The second substrate 42 is electrically connected to the other end (lower end) of the terminal member 8. As can be seen, the second substrate 42 is electrically connected to the coil 31 via the terminal member 8. Optionally, the wire 310 of the coil 31 could be extended to be directly electrically connected to the second substrate 42. However, the terminal member 8 is suitably interposed between the wire 310 and the second substrate 42 to reduce the chances of the wire 310 snapping.

<Electric Power Tool>

An electric power tool 10 according to this embodiment may be implemented as a drill driver or an impact driver, for example.

Figure 6:
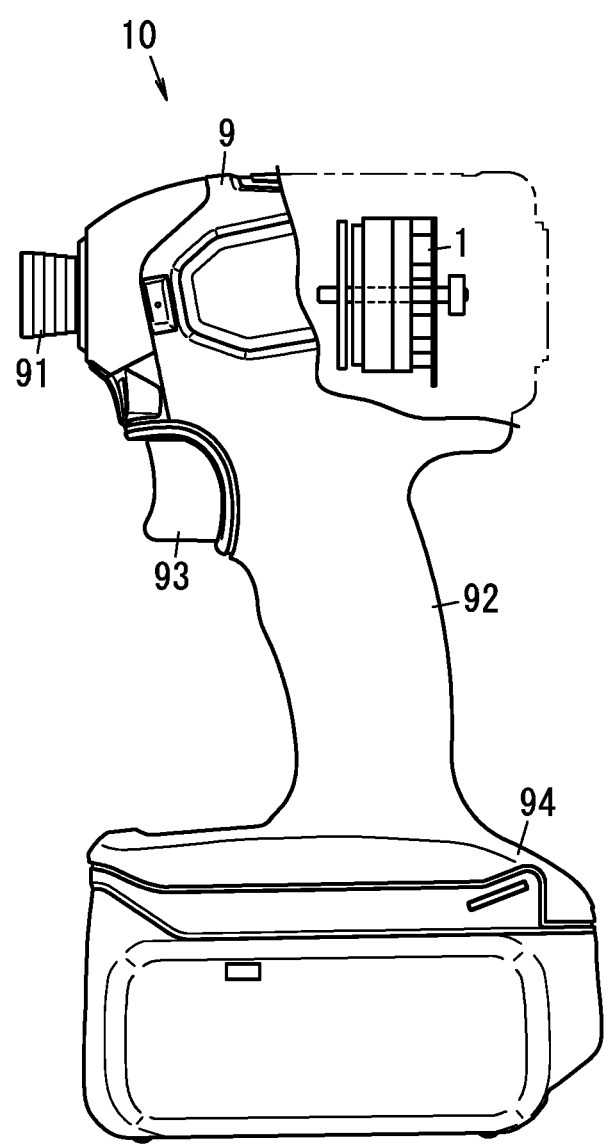
FIG. 6 is a partially cutaway, schematic side view of an electric power tool according to the exemplary embodiment of the present disclosure.

As shown in FIG. 6, the electric power tool 10 includes the motor 1 for electric power tools, an electric power tool body 9, a chuck 91, a grip 92, a trigger 93, and a pedestal 94.

The electric power tool body 9 is a member with a generally cylindrical shape. The electric power tool body 9 houses the motor 1 for electric power tools therein.

The chuck 91 is connected to the tip of the electric power tool body 9. The chuck 91 is a portion, to which a bit with any of various shapes selected according to the intended use of the electric power tool 10 is attached so as to be rotatable with respect to the electric power tool body 9. The chuck applies rotational driving force, which has been transmitted through a rotation transmission mechanism, to the bit, thus rotating the bit with respect to the electric power tool body 9.

The grip 92 is a member allowing the user to hold the electric power tool 10 during use. The grip 92 is connected to the side surface of the electric power tool body 9.

The trigger 93 is a switch for driving or stopping the motor 1 for electric power tools. The trigger 93 is provided for the grip 92. The trigger 93 is configured to be pressed down into the grip 92. When the trigger 93 is pressed down into the grip 92, power is supplied to the motor 1 for electric power tools, thus turning the rotational shaft 21. When no external force is applied thereto, the trigger 93 keeps protruding from the grip 92 with the elastic force applied from a spring (not shown) arranged inside the grip 92. Thus, removing the force of pressing the trigger 93 into the grip 92 while the rotational shaft 21 is turning causes the trigger 93 to protrude from the grip 92 and the supply of the power to the motor 1 for electric power tools to be suspended, thus stopping the rotation of the rotational shaft 21.

The pedestal 94 is a member that allows the electric power tool 10 to be put on a flat surface such as a floor and stand upright. The pedestal 94 is connected to the tip of the grip 92 and has a flat bottom.

Although not shown, the electric power tool 10 further includes a rotation transmission mechanism for transmitting the rotational driving force of the rotational shaft 21 of the motor 1 for electric power tools to the chuck 91, a rechargeable battery, a circuit for supplying the power from the rechargeable battery to the motor 1 for electric power tools according to the state of the trigger 93, and other constituent elements.

3. Resume

As can be seen from the foregoing description of exemplary embodiments, the present disclosure has the following aspects. In the following description, reference signs are added in parentheses to the respective constituent elements solely for the purpose of clarifying the correspondence between those aspects of the present disclosure and the exemplary embodiments described above.

A motor (1) for electric power tools according to a first aspect includes: a rotor (2) having a rotational shaft (21); a stator (3) having a coil (31) configured to rotate the rotor (2); a first substrate (41) mounting a sensor element (410) thereon, the sensor element (410) being configured to detect a rotational position of the rotor (2); and a second substrate (42) mounting a switching element 425 thereon, the switching element 425 being configured to change, based on a result of detection by the sensor element (410), a conducting direction in which a current flows with respect to the coil (31). The first substrate (41) and the second substrate (42) are arranged side by side along, and intersect at right angles with, the rotational shaft (21).

This aspect allows the motor (1) to provide high-torque output and have an extended continuous running time.

In a motor (1) for electric power tools according to a second aspect, which may be implemented in conjunction with the first aspect, the first substrate (41) and the second substrate (42) are arranged to face each other.

This aspect reduces the overall size of the motor (1) for electric power tools.

In a motor (1) for electric power tools according to a third aspect, which may be implemented in conjunction with the first or second aspect, the first substrate (41) is arranged between the stator (3) and the second substrate (42) in a direction in which the rotational shaft (21) extends.

This aspect allows the sensor element (410) to detect the rotational position of the rotor (2) accurately, and also reduces the chances of the switching element 425 being affected by the heat generated by the coil (31).

A motor (1) for electric power tools according to a fourth aspect, which may be implemented in conjunction with any one of the first to third aspects, further includes an insulator (5) to fix the stator (3), the first substrate (41), and the second substrate (42).

This aspect allows the stator (3), the first substrate (41), and the second substrate (42) to be electrically insulated from each other.

In a motor (1) for electric power tools according to a fifth aspect, which may be implemented in conjunction with the fourth aspect, the insulator (5) includes: a first mounting portion (521) to mount the first substrate (41) thereon; and a second mounting portion (522) to mount the second substrate (42) thereon. The first mounting portion (521) and the second mounting portion (522) are arranged at two different levels in the direction in which the rotational shaft (21) extends.

This aspect allows the first substrate (41) and the second substrate (42) to be arranged at two different levels in the direction in which the rotational shaft (21) extends A motor (1) for electric power tools according to a sixth aspect, which may be implemented in conjunction with the fourth or fifth aspect, further includes a heat sink (6). The second substrate (42) is fixed onto the insulator (5) via the heat sink (6).

This aspect improves the heat dissipation properties of the motor (1) for electric power tools.

In a motor (1) for electric power tools according to a seventh aspect, which may be implemented in conjunction with any one of the first to sixth aspects, each of the first substrate (41) and the second substrate (42) includes a connecting member (43) to be electrically connected to an external device. The respective connecting members (43) of the first substrate (41) and the second substrate (42) are both arranged on one side of the rotational shaft (21) in a direction perpendicular to the rotational shaft (21).

This aspect reduces the overall size of the motor (1) for electric power tools.

In a motor (1) for electric power tools according to an eighth aspect, which may be implemented in conjunction with any one of the first to seventh aspects, the first substrate (41) is arranged in an area forming part of a circumference of the rotational shaft (21).

This aspect reduces the amount of a material used to make the first substrate (41).

In a motor (1) for electric power tools according to a ninth aspect, which may be implemented in conjunction with any one of the first to eighth aspects, the first substrate (41) and the second substrate (42) are arranged within a range defined by a total length of the rotational shaft (21).

This aspect reduces the overall size of the motor (1) for electric power tools.

A motor (1) for electric power tools according to a tenth aspect, which may be implemented in conjunction with the ninth aspect, further includes two bearings (7; 71, 72) to support the rotational shaft (21) rotatably. The first substrate (41) and the second substrate (42) are arranged between the two bearings (7; 71, 72).

This aspect reduces the overall size of the motor (1) for electric power tools.

In a motor (1) for electric power tools according to an eleventh aspect, which may be implemented in conjunction with any one of the first to tenth aspects, when measured along the radius of the rotational shaft (21), the first substrate (41) and the second substrate (42) have mutually different dimensions.

This aspect allows an installation space to be secured for respective parts.

In a motor (1) for electric power tools according to a twelfth aspect, which may be implemented in conjunction with any one of the seventh to eleventh aspects, the respective connecting members (431, 432) of the first substrate (41) and the second substrate (42) are connected to the external device in two different connecting directions.

This aspect reduces a dead space.

A motor (1) for electric power tools according to a thirteenth aspect, which may be implemented in conjunction with any one of the fourth to twelfth aspects, further includes a terminal member (8) secured to the insulator (5). The second substrate (42) is electrically connected to the coil (31) via the terminal member (8).

This aspect reduces the chances of the wire (310) of the coil (31) snapping.

An electric power tool (10) according to a fourteenth aspect includes: the motor (1) for electric power tools according to any one of the first to thirteenth aspects; and an electric power tool body (9) to house the motor (1) for electric power tools therein.

This aspect allows the motor (1) to provide high-torque output and also allows the electric power tool (10) to have an extended continuous running time.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A motor for electric power tools, the motor comprising:
   a rotor having a rotational shaft;
   a stator having a coil configured to rotate the rotor;
   a first substrate mounting a sensor element thereon, the sensor element being configured to detect a rotational position of the rotor;
   a second substrate mounting a switching element thereon, the switching element being configured to change, based on a result of detection by the sensor element, a conducting direction in which a current flows with respect to the coil; and
   an insulator being configured to be fixed to the first substrate and the second substrate; and
   two bearings being configured to support the rotational shaft rotatably,
   the first substrate and the second substrate being arranged side by side along, and intersecting at right angles with, the rotational shaft,
   the first substrate and the second substrate being arranged within a range defined by a total length of the rotational shaft,
   the first substrate and the second substrate being arranged between the two bearings.

2. The motor for electric power tools of claim 1, wherein the first substrate and the second substrate are arranged to face each other.

3. The motor for electric power tools of claim 1, wherein the first substrate is arranged between the stator and the second substrate in a direction in which the rotational shaft extends.

4. The motor for electric power tools of claim 1, wherein the insulator is configured to be fixed to the stator.

5. The motor for electric power tools of claim 1, wherein the insulator includes: a first mounting portion configured to mount the first substrate thereon; and a second mounting portion configured to mount the second substrate thereon, and
   the first mounting portion and the second mounting portion are arranged at two different levels in the direction in which the rotational shaft extends.

6. The motor for electric power tools of claim 1, further comprising a heat sink, wherein the second substrate is fixed onto the insulator via the heat sink.

7. The motor for electric power tools of claim 1, wherein each of the first substrate and the second substrate includes a connecting member to be electrically connected to an external device, and
   the respective connecting members of the first and second substrates are both arranged on one side of the rotational shaft in a direction perpendicular to the rotational shaft.

8. The motor for electric power tools of claim 7, wherein the respective connecting members of the first and second substrates are connected to the external device in two different connecting directions.

9. The motor for electric power tools of claim 1, wherein the first substrate is arranged in an area forming part of a circumference of the rotational shaft.

10. The motor for electric power tools of claim 1, wherein when measured along the radius of the rotational shaft, the first substrate and the second substrate have mutually different dimensions.

11. The motor for electric power tools of claim 1, further comprising a terminal member secured to the insulator, wherein
   the second substrate is electrically connected to the coil via the terminal member.

12. An electric power tool comprising:
   the motor for electric power tools of claim 1; and
   an electric power tool body configured to house the motor for electric power tools therein.

\* \* \* \* \*